United States Patent [19]

Elphingstone et al.

[11] 4,215,001

[45] Jul. 29, 1980

[54] METHODS OF TREATING SUBTERRANEAN WELL FORMATIONS

[75] Inventors: Eugene A. Elphingstone; Marvin D. Misak; James E. Briscoe, all of Duncan, Okla.

[73] Assignee: Halliburton Company, Duncan, Okla.

[21] Appl. No.: 953,287

[22] Filed: Oct. 20, 1978

Related U.S. Application Data

[63] Continuation of Ser. No. 871,725, Jan. 23, 1978, abandoned.

[51] Int. Cl.$^2$ .................. E21B 43/27; E21B 43/26
[52] U.S. Cl. .................. 252/8.55 C; 166/307; 166/308; 252/8.55 R
[58] Field of Search ............ 252/8.55 R, 8.55 C, 252/8.5 R, 8.5 B, 8.5 LC; 166/307, 308

[56] References Cited

U.S. PATENT DOCUMENTS

| | | | |
|---|---|---|---|
| 2,236,147 | 3/1941 | Lerch et al. | 166/292 |
| 2,330,145 | 9/1943 | Reimers | 166/292 |
| 2,778,427 | 1/1957 | Cardwell et al. | 252/8.55 X |
| 3,373,107 | 3/1968 | Rice et al. | 137/13 X |
| 3,375,872 | 4/1968 | McLaughlin et al. | 166/308 X |
| 3,378,074 | 4/1968 | Kiel | 137/13 X |
| 3,483,121 | 12/1969 | Jordan | 252/8.55 |
| 3,779,914 | 12/1973 | Nimerick | 252/8.55 |
| 3,865,190 | 2/1975 | Christopher et al. | 166/308 |
| 4,061,580 | 12/1977 | Jahnke | 252/8.55 |

FOREIGN PATENT DOCUMENTS 733033   4/1966   Canada .................. 252/8.5 B

*Primary Examiner*—Herbert B. Guynn
*Attorney, Agent, or Firm*—Thomas R. Weaver; C. Clark Dougherty, Jr.; John H. Tregoning

[57] ABSTRACT

A method of treating a subterranean well formation wherein a highly viscous thixotropic treating fluid is introduced into the formation. The highly viscous thixotropic treating fluid is formed by combining an aqueous acid solution with an aqueous alkali metal silicate solution whereby a polymerized alkali metal silicate gel is produced followed by shearing of the gel to impart thixotropic properties thereto.

25 Claims, No Drawings

METHODS OF TREATING SUBTERRANEAN WELL FORMATIONS

This is a continuation of application Ser. No. 871,725, filed Jan. 23, 1978, now abandoned.

In the treatment of subterranean well formations it is often desirable or necessary to introduce a highly viscous treating fluid into the formation. For example, when a highly porous and permeable formation is encountered it is sometimes necessary to contact all or a portion of the formation with a highly viscous material to seal the contacted portions so that subsequently introduced treating fluids are diverted to desired areas or to other formations. Further, in hydraulic fracturing processes carried out in subterranean formations, i.e., creating and/or propping fractures in formations, highly viscous fracturing fluids are often utilized with or without propping agent suspended therein. Commonly, such fracturing fluids are pumped into a formation being treated at a rate and pressure sufficient to produce one or more fractures therein. Continued pumping of the fracturing fluid extends the fractures, and when the fracturing fluid contains propping agent suspended therein, the propping agent is left in the fracture. In fracture-acidizing treatments of subterranean formations, i.e., creating fractures in a formation, propping the fractures and dissolving minerals in the formation to open pore spaces therein, highly viscous fracture-acidizing fluids are often utilized.

Highly viscous well formation treating fluids are particularly advantageous in carrying out fracturing and/or fracture-acidizing procedures in that such fluids are capable of opening one or more fractures to a width sufficient to place propping agent therein without excessive leak-off of the fluid, and such highly viscous fluids are capable of maintaining propping agent in suspension for long periods of time without excessive settling. However, problems have been encountered in the use of high viscosity treating fluids utilized heretofore, e.g., complexed gels, in that such gels generally become less viscous when high formation temperatures are encountered, i.e., above about 140° F., and/or break down and become less viscous in the presence of acid. Such reduction in viscosity in well formation treating fluids can often produce undesirable results. For example, if the fluids are used as fracturing fluids with propping agent suspended therein, a reduction in the viscosity of the fluid allows the propping agent to rapidly settle resulting in inadequate propping of fractures produced. Also, heretofore used complexed gels often cause significant damage to the formation treated therewith, i.e., bring about a reduction in the permeability thereof.

In carrying out the treatment of subterranean well formations using highly viscous fluids, it is desirable that the fluids be thixotropic, i.e., that the fluids have the property of developing a low viscosity in turbulent flow, but exhibiting a high viscosity when at rest, the transition being reversible. By the present invention, methods of treating subterranean well formations with highly viscous thixotropic treating fluids which are stable at high temperatures and in the presence of acid are provided.

The method of the present invention for treating a subterranean well formation comprises combining an aqueous acid solution with an aqueous alkali metal silicate solution having a pH greater than about 11 in an amount sufficient to lower the pH of the resulting mixture to a level in the range of from about 7.5 to about 8.5 thereby forming a polymerized alkali metal silicate gel, shearing the gel to obtain a highly viscous treating fluid having thixotropic properties and then introducing the treating fluid into the subterranean well formation.

A variety of alkali metal silicates can be utilized in accordance with the present invention, e.g., sodium, potassium, lithium, rubidium and cesium silicate. Of these, sodium silicate is preferred, and of the many forms in which sodium silicate exists, those having an $Na_2O:SiO_2$ weight ratio in the range of from about 1:2 to about 1:4 are most preferred. A specifically preferred material for use in accordance with the method of the present invention is a commercially available aqueous sodium silicate solution having a density of 11.67 pounds per gallon, an $Na_2O:SiO_2$ weight ratio of about 1:3.22 (Grade 40) and having the following approximate analysis:

| Component | % by Weight |
|---|---|
| $Na_2O$ | 9.1 |
| $SiO_2$ | 29.2 |
| Water | 61.7 |
| TOTAL | 100.00 |

A variety of acids can also be used, either organic or inorganic as well as acid producing materials. Examples of inorganic acids which can be used are hydrochloric acid, sulfuric acid, phosphoric acid and nitric acid. Examples of organic acids which can be used are formic acid and acetic acid. An example of an acid forming material which can be used is benzotrichloride. Of the acids and acid forming materials which can be used, hydrochloric acid, sulfuric acid, phosphoric acid and mixtures of such acids are preferred with hydrochloric acid being the most preferred. As will be understood by those skilled in the art, hydrofluoric acid cannot be utilized in that its reaction with silicates has an adverse affect on the formation of polymerized silicate gel.

In preparing a highly viscous fluid having thixotropic properties and a high pH for treating a subterranean well formation, an aqueous alkali metal silicate solution having a pH of greater than about 11 is first prepared. Such a solution using Grade 40 sodium silicate solution starting material is prepared by mixing about 5 parts by volume Grade 40 sodium silicate solution with about 95 parts by volume water. The resulting solution has a pH in the range of from about 11 to about 12, and a viscosity of about 1 centipoise. To this solution is added an aqueous acid solution, such as a 20° Bé aqueous hydrochloric acid solution, while agitating the mixture, to lower the pH of the mixture to a value in the range of from about 7.5 to about 8.5 whereby the alkali metal silicate polymerizes to form a highly viscous rigid gel. While a polymerized silicate gel will form at pH levels other than from about 7.5 to about 8.5, the rate of formation of the gel is greatest in such range.

Upon polymerization of the alkali metal silicate in the manner described above, a highly crosslinked rigid gel structure is formed which is not soluble in water, but which is gelatinous due to water being entrapped in the polymer structure. In order to impart thixotropic properties to the polymerized silicate gel, it is sheared by mixing or agitation, preferably while the polymerization reaction is taking place. It is believed the shearing of the gel divides it into fine particles carrying static charges which will not agglomerate into a mass and which exhibit thixotropic properties, i.e., a low viscosity in turbulent flow but a high viscosity when at rest or at low shear rates.

After being sheared, conventional well treating additives such as surfactants, friction reducers, fluid loss additives, etc., can be added to the gel as can a propping agent such as sand, and the resulting high viscosity thixotropic fluid is introduced into a subterranean well formation to carry out a treatment therein.

If it is desired that the gel have a low pH such as for use as a fracture-acidizing treatment fluid, after the formation of the gel at a pH of from about 7.5 to 8.5, additional aqueous acid solution is added to the gel to obtain a treating fluid of desired acid strength. For example, additional acid solution can be added to the gel in an amount sufficient to obtain a mixture containing excess acid in a quantity in the range of from about 1 percent to about 5 percent by weight of the mixture.

In order to increase the viscosity of the polymerized silicate gel, a gelling agent can be added thereto which hydrates with free water contained in the gel. Suitable such gelling agents are hydratable polysaccharides and polyacrylamides. Polysaccharides such as hydratable galactomannan gums and derivatives thereof, hydratable glucomannan gums and derivatives thereof and hydratable cellulose derivatives are particularly suitable, and of these, guar gum, locust bean gum, karaya gum, hydroxypropyl guar gum, carboxymethylhydroxypropyl guar gum, carboxymethylcellulose, carboxymethylhydroxyethylcellulose and hydroxyethylcellulose are preferred. The most preferred gelling agent for use with the polymerized silicate gel having a pH in the range of from about 7.5 to 8.5 is hydroxypropyl guar gum.

The addition of the above-mentioned gelling agents to the polymerized silicate gel mixture increases the viscosity of the free water in the mixture resulting in an increase in the overall viscosity of the mixture. However, such gelling agents degrade with time in the presence of acid and therefore are suitable for use in the high pH fluid described above, but are not as suitable in polymerized silicate mixtures of low pH, i.e., those containing excess acid. Also, the addition of excess acid to the polymerized silicate gel causes the gel to thin out and lose its thixotropic properties to some degree. This is believed to be due to the fact that the sheared gel particles have negative static charges which cause the particles to repel each other which in turn gives the gel its thixotropic properties. When acid is added to the gel, the negative charges are at least partially neutralized which decreases the thixotropic properties. In order to overcome this problem and to increase the viscosity of the gel mixture containing excess acid, certain gelling agents which also function as surfactants can be utilized. It is believed the surface active properties of such gelling agents prevent the charged particles from agglomerating in the presence of acid and thereby prevent the corresponding thinning out and loss of thixotropic properties. Suitable such surfactant-gelling agents are ethoxylated aliphatic or aromatic amines, polyvinylpyrrolidine and biopolymers such as xanthan gum. Of these, ethoxylated aliphatic amines, i.e., the reaction products of fatty acids and amines, having the following general formula are preferred:

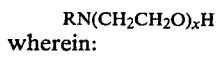
wherein:

R is a fat or oil having in the range of from about 6 to about 30 carbon atoms, and x is a numeral in the range of from about 1 to about 50.

Examples of such compounds which are commercially available are the reaction product of stearic acid, ammonia and ethylene oxide sold by the Armak Industrial Chemicals Division of Armak Company under the trade designation ETHOMEEN 18/60 and the reaction product of soya fatty acid, ammonia and ethylene oxide sold by Armak under the trade designation ETHOMEEN S-12. ETHOMEEN S-12 is the most preferred surfactant-gelling agent for use in accordance with this invention.

An alternate procedure for forming a highly viscous thixotropic acidic treating fluid is to combine an aqueous alkali metal silicate solution having a pH greater than about 11 with a concentrated aqueous acid solution in a quantity whereby excess acid is present in the resulting mixture in an amount in the range of from about 1 percent by weight to about 28 percent by weight while mixing or agitating the resultant mixture. A polymerized alkali metal silicate gel is formed in the mixture at a rapid rate resulting in a highly viscous acidic fluid. In order to impart thixotropic properties to the fluid, it is sheared in the manner described above. After shearing, conventional well treating additives such as surfactants, friction reducers, etc., are added to the fluid as well as propping agent if used. In addition, the surfactant-gelling agents described above for use in acid fluids can be added to increase the viscosity of the mixture.

In fracturing a subterranean well formation in accordance with the method of the present invention, an aqueous acid solution, preferably 30 to 35 percent by weight hydrochloric acid, is combined with an alkali metal silicate solution, preferably sodium silicate, having a pH of greater than about 11, in an amount sufficient to lower the pH of the resulting mixture to a level in the range of from about 7.5 to about 8.5 thereby forming a polymerized alkali metal silicate gel. The mixture is agitated or mixed while the polymerized silicate gel is being formed to thereby shear the gel and impart thixotropic properties thereto. In order to increase the viscosity of the treating fluid, a gelling agent, preferably hydroxypropyl guar gum is added to the fluid while it is being agitated in an amount of about 0.2 percent by weight. Other conventional well treating additives and propping agent, if used, are also added to the fluid while it is being agitated and the resulting high pH fracturing fluid is introduced into a subterranean formation at a flow rate and pressure sufficient to produce a fracture therein.

In carrying out a fracture-acidizing treatment in a subterranean formation, the highly viscous thixotropic polymerized silicate gel composition is prepared as described above followed by the addition of excess acid solution to obtain a low pH treating fluid, e.g., containing excess acid in an amount in the range of from about 1 percent to about 5 percent by weight. As indicated above, prior to adding the excess acid to the sheared polymerized silicate gel, a surfactant-gelling agent of the type mentioned above which increases the viscosity of the fluid and imparts stability thereto can be combined with the fluid. Relatively small quantities of such surfactant-gelling agents are required, generally in the range of from about 5 to about 30 pounds of surfactant-gelling agent per 1000 gallons of sodium silicate gel. Propping agent is added to the resulting low pH fracture-acidizing fluid and it is introduced into a subterranean formation at a flow rate and pressure sufficient to produce a fracture therein, place proppant in the fracture and dissolve minerals whereby the permeability of the formation adjacent the fracture is increased.

The polymerized silicate treating fluids can be prepared in batch or they can be prepared continuously while being pumped or otherwise introduced into a subterranean well formation. After being introduced into the formation, the polymerized silicate gel dehydrates at a relatively rapid rate, and consequently it is not necessary to include a chemical for breaking the sodium silicate gel in the fluids. The time required for the gel to dehydrate depends on the rate of water loss to the formation and other factors, but generally is within the range of from about 4 hours to about 24 hours. Upon dehydrating, some powdered silicate remains in the treated formation which can readily be removed by contacting the formation with hydrofluoric acid. Prior to the dehydration of the polymerized silicate gel, it has excellent stability, i.e., retains its high viscosity over a wide temperature range (up to about 500° F.). The treating fluids are particularly suitable for treating subterranean well formations of low permeability in that they are relatively non-damaging as compared to conventional fluids to such formations, i.e., do not appreciably reduce the permeability thereof.

The following examples are presented to further illustrate the invention.

EXAMPLE 1

Several polymerized sodium silicate gels are prepared in the laboratory using a Grade 40 sodium silicate solution. The quantities of Grade 40 sodium silicate solution, tap water containing 2 percent potassium chloride and 20° Bé hydrochloric acid (approximately 31.45 percent by weight hydrochloric acid) shown in Table I below are used. Except for those gels which are prepared by directly combining the acid and sodium silicate solutions, several drops of phenophthalein indicator are added to the diluted sodium silicate solution followed by the addition of hydrochloric acid solution in the amount required to reach an end point, i.e., a pH in the range of from about 8 to about 8.5. Following the addition of the acid and while the polymerized sodium silicate gel forms, the mixutre is sheared for 10 minutes using a Jabsco pump.

The gels contain 5 percent, 7½ percent and 10 percent by volume Grade 40 sodium silicate and the last three gels shown in Table I contain excess acid in the amounts given. Viscosities of the gels are apparent viscosities measured on a Model 35 FANN viscometer, No. 1 spring, standard bob and sleeve at room temperature and at 300 rpm.

TABLE I

VISCOSITIES OF VARIOUS POLYMERIZED SODIUM SILICATE GELS

| SODIUM SILICATE SOLUTION | | | | POLYMERIZED SODIUM SILICATE GEL | | | |
|---|---|---|---|---|---|---|---|
| Water Containing 2% HCl, ml | Grade 40 sodium Silicate Solution, ml | pH | ACID SOLUTION, ml | pH | % by Volume Grade 40 Sodium Silicate | Viscosity, cp | EXCESS ACID, % BY VOLUME |
| 932 | 50 | 11–12 | 18 (20° Bé HCl) | 8.5 | 5 | 30 | 0 |
| 899.4 | 75 | 11–12 | 25.6 (20° Bé HCl) | 8.0 | 7.5 | 40 | 0 |
| 868 | 100 | 11–12 | 32 (20° Bé HCl) | 8.0 | 10.0 | 70 | 0 |
| 0 | 500 | >12 | 500 (20° Bé HCl)[1] | <1 | 5 | 30 | 15 |
| 782 | 50 | 11–12 | 18 (20° Bé HCl) 150 (20° Bé HCl)[2] | 8.0 | 5 | 30 | 5 |
| 15 | 10 | 11–12 | 175 (20° Bé HCl)[1] | <1 | 5 | 30 | 28 |

[1] HCl and Sodium Silicate combined directly.
[2] Polymerized Sodium Silicate gel formed first followed by addition of excess acid.

EXAMPLE 2

Polymerized sodium silicate gel is formed in gel particles with some free water between the gel particles. In order to increase the overall viscosity of the gel, a hydroxypropyl guar gum gelling agent is combined with the sodium silicate gel so that the gelling agent is hydrated with the free water contained therein. In the laboratory, a high pH 5 percent Grade 40 sodium silicate gel is prepared using phenophthalein indicator and 20° Bé hydrochloric acid as described in Example 1. The gelling agent is added to samples of the polymerized sodium silicate gel using two procedures. In the first procedure, the gelling agent is mixed and hydrated in the tap water containing potassium chloride before combining the Grade 40 sodium silicate solution therewith and gelling the sodium silicate with hydrochloric acid. In the second procedure the gelling agent is added to the polymerized sodium silicate gel after it is formed and the pH of the gel is lowered by the addition of additional hydrochloric acid to a value in the range of 5.5 to 6 in order to speed up the hydration of the gelling agent.

The apparent viscosities of the resulting gel mixtures are measured on a Model 35 FANN viscometer, No. 1 spring, standard bob and sleeve at 300 rpm. The results of these tests are given in Table II.

TABLE II

VISCOSITIES OF HIGH pH POLYMERIZED SODIUM SILICATE GELS WITH GELLING AGENT COMBINED THEREWITH

| Test No. | Quantity of Gelling Agent Combined with Sodium Silicate Gel, Pounds of Gelling Agent/1000 Gallons Sodium Silicate Gel | Viscosity of Sodium Silicate Gel Without Gelling Agent cp | Viscosity of Sodium Silicate Gel with Gelling Agent cp Elapsed Time, Hours | | |
|---|---|---|---|---|---|
| | | | 0 | 1 | 24 |
| 1[1] | 10 | 35 | 50 | 39 | 29 |
| 2[1] | 20 | 35 | 83 | 70 | 49 |
| 3[1] | 25 | 35 | 65 | 65 | 59 |
| 4[1] | 30 | 35 | 37 | 35 | 29 |
| 5[2] | 10 | 35 | 63 | 63 | 50 |
| 6[2] | 15 | 35 | 67 | 67 | 52 |
| 7[2] | 20 | 35 | 98 | 93 | 62 |
| 8[2] | 25 | 35 | 113 | 90 | 67 |

TABLE II-continued

VISCOSITIES OF HIGH pH POLYMERIZED SODIUM SILICATE GELS WITH GELLING AGENT COMBINED THEREWITH

| Test No. | Quantity of Gelling Agent Combined with Sodium Silicate Gel, Pounds of Gelling Agent/1000 Gallons Sodium Silicate Gel | Viscosity of Sodium Silicate Gel Without Gelling Agent cp | Viscosity of Sodium Silicate Gel with Gelling Agent cp Elapsed Time, Hours | | |
|---|---|---|---|---|---|
| | | | 0 | 1 | 24 |
| 9[2] | 30 | 35 | 116 | 70 | 51 |

[1]Gelling Agent added to water prior to forming Sodium Silicate Gel.
[2]Gelling Agent added after Sodium Silicate Gel formed.

As shown in Table II, the addition of hydroxypropyl guar gum gelling agent increases the viscosity of the gel, and the best viscosities are obtained by adding the gelling agent after the polymerized sodium silicate gel is formed.

EXAMPLE 3

Polyvinylpyrrolidine, xanthan gum and ethoxylated aliphatic amines are tested in the laboratory as gelling agents for acidic polymerized sodium silicate gels.

The procedure for testing the polymers is to first prepare a polymerized sodium silicate gel containing 5 percent excess acid in accordance with the procedure set forth in Example 1. The gelling agent is added to the sodium silicate gel in the quantity indicated in Table III below while agitating the mixture. Viscosities are measured using a Model 35 FANN viscometer, No. 1 spring, standard bob and sleeve at 300 rpm.

TABLE III

VISCOSITIES OF POLYMERIZED SODIUM SILICATE GELS CONTAINING EXCESS ACID AND GELLING AGENTS

| Gelling Agent Used | Quantity of Gelling Agent Combined with Sodium Silicate Gel, Pounds or Gallons Gelling Agent/1000 Gallons Sodium Silicate Gel | Viscosity of Sodium Silicate Gel Without Gelling Agent cp | Viscosity of Sodium Silicate Gel with Gelling Agent cp |
|---|---|---|---|
| Xanthan gum | 15 pounds | 35 | 60 |
| Polyvinylpyrrolidine | 15 pounds | 35 | 43 |
| ethoxylated aliphatic amine[1] | 5 gallons | 7 | 34 |
| ethoxylated aliphatic amine[1] | 3 gallons | 7 | 29 |
| ethoxylated aliphatic amine[1] | 1 gallon | 7 | 20 |

[1]ETHOMEEN S-12 sold by Armak Company

As shown in Table III, the surfactant-gelling agents improve the overall viscosities of sodium silicate gels containing excess acid. Observations of the gels indicate that the gels are consistent and thick with little water separation. In addition, the gelling agents stabilize the gels and prevent loss of viscosity and thixotropic properties at low pH.

EXAMPLE 4

Liquid permeability tests are carried out in the laboratory using Berea sandstone (high permeability), Bandera sandstone (medium permeability) and Ohio sandstone (low permeability). Tap water containing 2% by weight potassium chloride is first caused to flow through the test cores at an upstream perssure of approximately 120 psig and the liquid permeability of the cores calculated from the average flow rate of liquid flowing through the cores, the liquid viscosity, the core length, liquid pressure, and core area. The cores are next treated with a 5 percent polymerized sodium silicate gel prepared as described in Example 1 by flowing the gel through the cores followed by immersion of the cores in the gel for from about 15 to about 24 hours during which time the fel is caused to break. The cores are then reverse flowed with tap water containing 2% by weight potassium chloride and the liquid permeability calculated. Additional cores are tested in the same manner, but the cores are treated with a highly viscous gel formed from water and hydroxypropyl guar gum (40 pounds hydroxypropyl guar gum per 1000 gallons of water) instead of the sodium silicate gel. The results of these tests are given in Table IV below.

TABLE IV

COMPARISON OF CORE LIQUID PERMEABILITIES BEFORE AND AFTER TREATMENT WITH POLYMERIZED SODIUM SILICATE GEL AND HYDROXYPROPYL GUAR GUM GEL

| Type of Core | Type of Gel Used | Initial Liquid Permeability, md | Final Liquid Permeability, md | Change in Liquid Permeability As a Result of Treatment |
|---|---|---|---|---|
| Berea Sandstone | Polymerized Sodium Silicate Gel | 16.2 | 17.3 | 7% Increase |
| Berea Sandstone | Hydroxypropyl Guar Gum Gel | 18.9 | 8 | 58% decrease |
| Bandera Sandstone | Polymerized Sodium Silicate Gel | 2.62 | 2.07 | 21% decrease |
| Bandera Sandstone | Hydroxypropyl Guar Gum Gel | 3.01 | 0.81 | 73% decrease |
| Ohio Sandstone | Polymerized Sodium Silicate Gel | 0.51 | 0.43 | 16% decrease |
| Ohio Sandstone | Hydroxypropyl Guar | | | |

TABLE IV-continued
COMPARISON OF CORE LIQUID PERMEABILITIES BEFORE AND AFTER TREATMENT WITH POLYMERIZED SODIUM SILICATE GEL AND HYDROXYPROPYL GUAR GUM GEL

| Type of Core | Type of Gel Used | Initial Liquid Permeability, md | Final Liquid Permeability, md | Change in Liquid Permeability As a Result of Treatment |
|---|---|---|---|---|
| | Gum Gel | 0.50 | 0.13 | 74% decrease |

From Table IV it can be seen that the polymerized sodium silicate gel is relatively non-damaging to formation permeability and is considerably less damaging to formation permeability than hydroxypropyl guar gum gel.

What is claimed is:

1. A method of fracturing a subterranean well formation comprising the steps of:

combining an aqueous solution of acid other than hydrofluoric acid with an aqueous alkali metal silicate solution having a pH of greater than about 11 in an amount sufficient to lower the pH of the resulting mixture to a level in the range of from about 7.5 to about 8.5 thereby forming a polymerized alkali metal silicate gel;

shearing said gel to thereby obtain a highly viscous thixotropic fracturing fluid; and introducing said fracturing fluid into said subterranean formation at a flow rate and pressure sufficient to produce a fracture therein.

2. The method of claim 1 wherein said alkali metal silicate is sodium silicate.

3. The method of claim 1 wherein said aqueous sodium silicate solution is Grade 40 sodium silicate solution diluted with water.

4. The method of claim 3 wherein said acid is selected from the group consisting of hydrochloric acid, sulfuric acid, phosphoric acid and mixtures thereof.

5. The method of claim 3 wherein said acid is hydrochloric acid.

6. The method of claim 1 which is further characterized to include the step of combining a gelling agent selected from the group consisting of hydratable galactomannan gums, hydratable glucomannan gums and hydratable cellulose derivatives with said polymerized sodium silicate gel in an amount sufficient to increase the viscosity thereof.

7. The method of claim 6 wherein said gelling agent is hydroxypropyl guar gum.

8. The method of claim 1 which is further characterized to include the step of dispersing a propping agent into said polymerized alkali metal silicate gel.

9. The method of claim 8 wherein said alkali metal silicate is sodium silicate and said propping agent is sand.

10. A method of fracture-acidizing a subterranean well formation comprising the steps of:

combining an aqueous solution of acid other than hydrofluoric acid with an aqueous alkali metal silicate solution having a pH of greater than about 11 in an amount sufficient to lower the pH of the resulting mixture to a level in the range of from about 7.5 to about 8.5 thereby forming a polymerized alkali metal silicate gel;

combining additional aqueous acid solution with said polymerized alkali metal silicate gel in an amount sufficient to obtain a mixture containing excess acid in a quantity in the range of from about 1 percent to about 5 percent by weight of the mixture;

shearing said polymerized alkali metal silicate gelacid mixture to thereby obtain a highly viscous thixotropic fracture-acidizing fluid; and introducing said fracture-acidizing fluid into said subterranean formation at a flow rate and pressure sufficient to produce a fracture therein.

11. The method of claim 10 wherein said alkali metal silicate is sodium silicate.

12. The method of claim 10 wherein said aqueous sodium silicate solution is Grade 40 sodium silicate solution diluted with water.

13. The method of claim 11 wherein said acid is selected from the group consisting of hydrochloric acid, sulfuric acid, phosphoric acid, and mixtures thereof.

14. The method of claim 11 wherein said acid is hydrochloric acid.

15. The method of claim 10 which is further characterized to include the step of combining a gelling agent selected from the group consisting of polyvinylpyrrolidone and xanthan gum with said polymerized alkali metal silicate gel-acid mixture in an amount sufficient to increase the viscosity thereof.

16. The method of claim 15 wherein said gelling agent is polyvinylpyrrolidine.

17. The method of claim 15 wherein said gelling agent is xanthan gum.

18. A method of fracture-acidizing a subterranean well formation comprising the steps of:

combining an aqueous alkali metal silicate solution having a pH of greater than about 11 with an aqueous solution of acid other than hydrofluoric acid in a quantity whereby excess acid is present in the resulting mixture in an amount in the range of from about 1% by weight to about 28% by weight of said mixture and whereby a polymerized alkali metal silicate gel is formed therein;

shearing said acid-gel mixture to thereby obtain a highly viscous thixotropic fracture-acidizing fluid; and introducing said fracture-acidizing fluid into said subterranean formation at a flow rate and pressure sufficient to produce a fracture therein.

19. The method of claim 18 wherein said alkali metal silicate is sodium silicate.

20. The method of claim 18 wherein said aqueous sodium silicate solution is Grade 40 sodium silicate solution diluted with water.

21. The method of claim 19 wherein said acid is selected from the group consisting of hydrochloric acid, sulfuric acid, phosphoric acid, and mixtures thereof.

22. The method of claim 19 wherein said acid is hydrochloric acid.

23. The method of claim 18 which is further characterized to include the step of combining a gelling agent selected from the group consisting of polyvinylpyrrolidone and xanthan gum with said gelacid mixture in an amount sufficient to increase the viscosity thereof.

24. The method of claim 23 wherein said gelling agent is polyvinylpyrrolidine.

25. The method of claim 23 wherein said gelling agent is xanthan gum.

* * * * *